(12) United States Patent
Sato et al.

(10) Patent No.: US 7,278,939 B2
(45) Date of Patent: Oct. 9, 2007

(54) POWER TRANSMISSION

(75) Inventors: Takao Sato, Saitama (JP); Shinji Kamiya, Saitama (JP); Yasuhiro Morimoto, Saitama (JP); Toru Kamoshida, Saitama (JP); Toshiyuki Yumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 579 days.

(21) Appl. No.: 10/767,210

(22) Filed: Jan. 30, 2004

(65) Prior Publication Data

US 2004/0185973 A1 Sep. 23, 2004

(30) Foreign Application Priority Data

Feb. 14, 2003 (JP) .............. 2003-035952
Feb. 21, 2003 (JP) .............. 2003-043769
Feb. 24, 2003 (JP) .............. 2003-045590

(51) Int. Cl.
*F16H 63/00* (2006.01)
(52) U.S. Cl. ...................................... 474/72
(58) Field of Classification Search ............. 474/8, 474/18, 28, 72; 475/200, 210; 192/3.58, 192/3.63; 477/39, 41, 44, 45; 74/664
See application file for complete search history.

(56) References Cited

U.S. PATENT DOCUMENTS

| | | | | |
|---|---|---|---|---|
| 3,340,749 | A * | 9/1967 | Schreiner et al. ........... 475/211 |
| 4,294,137 | A | 10/1981 | Piret et al. |
| 4,304,150 | A | 12/1981 | Lupo et al. |
| 5,050,457 | A * | 9/1991 | Takayama et al. ............ 474/70 |
| 5,092,198 | A * | 3/1992 | Morishige et al. ........... 477/46 |
| 5,207,617 | A * | 5/1993 | Kato et al. .................... 474/28 |
| 5,944,628 | A * | 8/1999 | Lee ............................. 475/214 |
| 6,359,404 | B1 * | 3/2002 | Sugiyama et al. .......... 318/432 |
| 6,855,084 | B2 * | 2/2005 | Sato et al. ................... 475/209 |
| 6,875,152 | B2 * | 4/2005 | Iwatuki et al. ................ 477/44 |
| 6,997,831 | B2 * | 2/2006 | Kanda et al. .................. 474/8 |

FOREIGN PATENT DOCUMENTS

| | | |
|---|---|---|
| EP | 0 319 044 A | 6/1989 |
| JP | 1-150065 | 6/1989 |
| JP | 4-357336 | 12/1992 |
| JP | 2002-48213 | 2/2002 |
| JP | 2003-130195 | 5/2003 |

* cited by examiner

*Primary Examiner*—Vicky A. Johnson
(74) *Attorney, Agent, or Firm*—Westerman, Hattori, Daniels & Adrian, LLP.

(57) ABSTRACT

A power transmission comprises a belt type continuously variable ratio-change mechanism CVT and a fixed ratio rotational transmission mechanism GT, which transmit the rotational driving force of a primary shaft 1 rotationally driven by an engine to a countershaft 3 with a speed ratio change. The continuously variable ratio-change mechanism comprises a drive pulley 10, a driven pulley 15 and a metal belt 14 while the fixed ratio rotational transmission mechanism GT comprises a forward drive gear train, a forward output transmission gear train, and a reverse drive gear train. The forward drive gear train transmits the rotation of an input drive gear 31 on the primary shaft 1 through an idler gear 32 to a LOW driven gear 33 on a secondary shaft 2, and the forward output transmission gear train transmits the rotation of the secondary shaft 2 to the countershaft 3. The reverse drive gear train transmits the rotation of the input drive gear 31 through the idler gear 32 to a reverse driven gear 36 on the countershaft 3.

12 Claims, 11 Drawing Sheets

POWER TRANSMISSION

FIELD OF THE INVENTION

The present invention relates to a power transmission that comprises a continuously variable ratio-change mechanism and a fixed ratio rotational transmission mechanism, the power transmission transmitting the rotation of the input shaft driven by a drive source to the output shaft with a rotational speed change.

BACKGROUND OF THE INVENTION

For example, Japanese Laid-Open Patent Publication No. H1(1989)-150065 discloses such a power transmission, which comprises a continuously variable ratio-change mechanism and a fixed ratio rotational transmission mechanism. The power transmission disclosed in this publication further comprises a torque converter, which receives the rotational driving force of an engine. The gear train (a gear type rotational transmission mechanism or a fixed ratio rotational transmission mechanism) and the belt type continuously variable ratio-change mechanism are arranged in parallel with each other between the input shaft and the output shaft of the transmission, with the input shaft of the transmission being connected with the output shaft of the torque converter and the output shaft of the transmission being connected rotationally to the drive wheels of a vehicle.

FIG. 11 shows the arrangement of power transmission members of the transmission disclosed in the above mentioned Japanese Laid-Open Patent Publication No. H1(1989)-150065. The drive pulley 501 of the belt type continuously variable ratio-change mechanism is disposed on the input shaft, whose rotational axis is marked with O11 in the drawing, and the driven pulley 502 is disposed on a middle shaft, whose rotational axis is marked with O12. A V belt 503 is disposed around these pulleys. By adjusting the widths of the pulleys 501 and 502, the speed change ratio of the transmission is varied continuously without any step. The rotation of the driven pulley 502, whose speed is changed in this way, is then transmitted from an output drive gear 510, which is disposed on a middle shaft, to an output driven gear 511, which meshes with the output drive gear 510. The output driven gear 511 is disposed on an output shaft, whose rotational axis is indicated with O13.

Additionally, the input shaft is provided with a forward low drive gear 505, which meshes with a forward low driven gear 506 disposed on the output shaft, whose rotational axis is O13. With this gear train, the transmission is set in a forward low speed ratio mode. In addition, the input shaft is provided also with a rearward drive gear 507, and this drive gear 507 meshes with a rearward idler gear 508, which meshes with the above mentioned output driven gear 511. With this gear train, the transmission is set in a rearward rotation mode. Furthermore, the output shaft is provided with a final drive gear 515. This gear meshes with a final driven gear 516, which is integrally provided in a differential mechanism, whose rotational axis is O14. With this arrangement, the rotational driving force transmitted to the output shaft with a rotational speed change is then transmitted through the final drive and driven gears 515 and 516 to the drive wheels of the vehicle.

Also, Japanese Laid-Open Patent Publication No. 2002-48213 discloses a power transmission that comprises a belt-type continuously variable ratio-change mechanism and a fixed ratio rotational transmission mechanism. In this transmission, the belt type continuously variable ratio-change mechanism and the fixed ratio rotational transmission mechanism are disposed in parallel with each other between the input shaft and the output shaft of the transmission, the input shaft being connected through a damper to an engine. The fixed ratio rotational transmission mechanism is equipped with a forward/reverse-switching mechanism, which comprises a planetary gear train disposed on the input shaft. The planetary gear train comprises a forward (starting) clutch and a reverse brake, which are used for switching the mode of the transmission between forward drive and reverse drive. In addition, a direct coupling clutch is provided on the input shaft for establishing the power transmission through the belt type continuously variable ratio-change mechanism.

In designing a power transmission that combines a continuously variable ratio-change mechanism and a fixed ratio rotational transmission mechanism, there are many possible arrangements for disposing these two mechanisms in parallel. Therefore, it is important to consider how efficiently and compactly they are integrated in the transmission.

Optimal arrangement should provide a high degree of freedom in positioning components while satisfying, for example, a range of speed change ratio, a maximum ratio and a minimum ratio that are required for the transmission. Yet, the transmission should be as small and compact as possible.

It is also important to position compactly the clutching means that switches the power transmission between the continuously variable ratio-change mechanism and the fixed ratio rotational transmission mechanism and the clutching means that switches the power transmission by the fixed ratio rotational transmission mechanism between its forward drive and reverse drive.

Furthermore, since the drive pulley and the driven pulley, which constitute the continuously variable ratio-change mechanism, and members that constitute the oil chambers for the drive and driven pulleys, respectively, have larger outer diameters, it is important to place these components compactly together with the fixed ratio rotational transmission mechanism.

From these points of view, the arrangement of the transmission disclosed in the above mentioned Japanese Laid-Open Patent Publication No. H1(1989)-150065 has a problem of not having a high degree of freedom for the above mentioned forward low drive gear 505 and driven gear 506 of the transmission, which define a forward low speed change ratio, i.e., a large speed change ratio (speed reduction ratio), requiring the diameter of the forward low drive gear 505 to be comparatively small and that of the forward low driven gear 506 to be comparatively large. Especially, it is difficult to make the diameter of the forward low drive gear 505 small since the forward low drive gear 505 is disposed on the input shaft, with the diameter of the forward low drive gear 505 being larger than that of the input shaft. As a result, the diameter of the forward low driven gear 506 is correspondingly large, contributing to the enlargement of the transmission. Moreover, because the distance between the input shaft and the output shaft is determined by these two gears that mesh with each other, there is not much freedom in positioning these shafts, and there is little freedom in deciding the position of the output shaft with respect to the input shaft.

In the arrangement of the transmission disclosed in the above mentioned Japanese Laid-Open Patent Publication No. H1(1989)-150065, which is shown in FIG. 11, the drive pulley of the belt type continuously variable ratio-change mechanism, a forward low clutch that establishes a forward low speed ratio, and a reverse clutch that establishes a reverse speed ratio are disposed in parallel with one another on the input shaft. As a result, the input shaft is relatively long in its axial direction, so the protrusion of the part of the transmission where the input shaft is incorporated is remarkable. This condition makes it difficult for the transmission to achieve a high degree of compactness. Similarly, in the case of the above mentioned transmission disclosed in Japanese Laid-Open Patent Publication No. 2002-48213, the drive pulley, the forward/reverse switching mechanism, which comprises a planetary gear train, the friction (starting) clutch, the rearward brake, and the direct coupling clutch are all disposed in parallel with one another on the input shaft. As a result, the part of the transmission where the input shaft is incorporated is a major cause that enlarges the transmission axially as well as radially. This is a problem that makes it difficult for the transmission to achieve a high degree of compactness.

SUMMARY OF THE INVENTION

To solve such problems, it is an object of the present invention to provide a power transmission that comprises a continuously variable ratio-change mechanism and a fixed ratio rotational transmission mechanism, the power transmission having an arrangement to provide a high degree of freedom for setting a speed change ratio and for positioning the shafts and to facilitate miniaturization and compactness.

It is another object of the present invention to provide a power transmission that comprises a continuously variable ratio-change mechanism and a fixed ratio rotational transmission mechanism, in which transmission, components like clutching means are arranged to exploit the space of the housing of the transmission, and thereby to facilitate miniaturization and compactness of the transmission.

It is yet another object of the present invention to provide a power transmission that facilitates miniaturization and compactness, with the components of a continuously variable ratio-change mechanism and the components (gears) of a fixed ratio rotational transmission mechanism being arranged to exploit the space of the housing of the transmission.

According to a first aspect of the present invention, a power transmission comprises a continuously variable ratio-change mechanism (for example, the belt type continuously variable ratio-change mechanism CVT described in the following embodiment) and a fixed ratio rotational transmission mechanism, which transmit the rotational driving force of an input shaft (for example, the primary shaft 1 described in the following embodiment) rotationally driven by a drive source (for example, an engine) to an output shaft (for example, the countershaft 3 described in the following embodiment) with a speed ratio change. The continuously variable ratio-change mechanism transmits the rotation from the input shaft to a middle shaft (for example, the secondary shaft 2 described in the following embodiment) at a continuously variable speed change ratio. The fixed ratio rotational transmission mechanism comprises a first rotational transmission gear train (forward drive gear train), a second rotational transmission gear train (forward output transmission gear train) and a third rotational transmission gear train (reverse drive gear train). The first rotational transmission gear train transmits the rotation of the input shaft to the middle shaft, and the second rotational transmission gear train transmits the rotation of the middle shaft to the output shaft. The third rotational transmission gear train transmits the rotation of the input shaft to the output shaft.

In this power transmission, preferably, the first rotational transmission gear train (forward drive gear train) comprises an input drive gear, which is provided on the input shaft, an idler gear, which is provided on an idler shaft and meshes with the input drive gear, and a forward driven gear, which is provided on the middle shaft and meshes with the idler gear. Also, preferably, the third rotational transmission gear train (reverse drive gear train) comprises the above mentioned input drive gear, the above idler gear and a reverse driven gear, which is provided on the output shaft and meshes with the idler gear.

In the power transmission constructed as described above, the fixed ratio rotational transmission mechanism has the first rotational transmission gear train (forward drive gear train), which transmits the rotation of the input shaft (input drive gear) through the idler shaft (idler gear) to the middle shaft (forward driven gear), the second rotational transmission gear train (forward output transmission gear train), which transmits the rotation of the middle shaft to the output shaft, and the third rotational transmission gear train (reverse drive gear train), which transmits the rotation of the input shaft (input drive gear) through the idler shaft (idler gear) to the output shaft (reverse driven gear). In this arrangement, the first and third rotational transmission gear trains both share the idler shaft (idler gear) for rotational transmission. As a result, this arrangement provides a high degree of freedom for determining speed change ratios and for positioning the shafts. Moreover, it is advantageous especially for miniaturizing and compacting the transmission because the idler shaft (idler gear) is shared by both the first and third rotational transmission gear trains to minimize the numbers of gears and shafts that are needed. Also, this arrangement, which makes the idler shaft (idler gear) be used commonly, enables the first and third rotational transmission gear trains to be positioned side by side in a common plane and thereby enables the axial length of the transmission to be shortened in design for miniaturization and compactness.

According to a second aspect of the present invention, a power transmission comprises a continuously variable ratio-change mechanism (for example, the belt type continuously variable ratio-change mechanism CVT described in the following embodiment) and a fixed ratio rotational transmission mechanism, which are disposed parallel with each other between an input shaft (for example, the primary shaft 1 described in the following embodiment) and an output shaft (for example, the countershaft 3 described in the following embodiment). The continuously variable ratio-change mechanism transmits the rotation of the input shaft to a middle shaft (for example, the secondary shaft 2 described in the following embodiment) at a continuously variable speed change ratio. The fixed ratio rotational transmission mechanism comprises a first rotational transmission gear train (for example, the LOW or forward drive gear train described in the following embodiment), a second rotational transmission gear train (for example, the forward output transmission gear train described in the following embodiment) and a third rotational transmission gear train (for example, the reverse drive gear train described in the following embodiment). The first rotational transmission gear train transmits the rotation of the input shaft to the middle shaft, and the second rotational transmission gear train transmits the rotation of the middle shaft to the output shaft. The third rotational transmission gear train transmits the rotation of the input shaft to the output shaft.

In this transmission, first clutching means (for example, the CVT clutch 21 described in the following embodiment), which sets the transmission of rotation from the input shaft through the continuously variable ratio-change mechanism to the middle shaft and then through the second rotational transmission gear train to the output shaft, is provided on the input shaft. Second clutching means (for example the LOW clutch 22 described in the following embodiment), which sets the transmission of rotation from the input shaft through the first and second rotational transmission gear trains to the output shaft, is provided on the middle shaft. Third clutching means (for example, the reverse clutch 23 described in the following embodiment), which sets the transmission of rotation from the input shaft through the third rotational transmission gear train to the output shaft, is provided on the output shaft.

As described above, the continuously variable ratio-change mechanism and the fixed ratio rotational transmission mechanism (or the first~third rotational transmission gear trains) are distributed on the three shafts, i.e., the input shaft, the middle shaft, and the output shaft, and the first~third clutching means are dispersed on these three shafts. By arranging these mechanisms and clutching means in a well balanced way, the space in the transmission housing is used effectively and efficiently for miniaturizing and compacting the power transmission. Furthermore, the second and third clutching means, which function to set the rotational transmission through the fixed ratio rotational transmission mechanism, are disposed on the middle shaft and on the output shaft, respectively, which shafts are located downstream in the respective rotational transmission paths. As a result, while the rotation is being transmitted through the continuously variable ratio-change mechanism with these clutching means being disengaged, relative rotational differences among the friction plates provided in these clutching means are kept relatively small, generating only a very small drag torque. This condition benefits in fuel economy and improves the durability of the clutches.

It is preferable that the continuously variable ratio-change mechanism comprise a drive pulley, which is provided on the input shaft, a driven pulley, which is provided on the middle shaft, and a V belt, which is disposed around the drive pulley and the driven pulley. In addition, preferably, the first clutching means is provided on the input shaft and positioned on the back of the stationary pulley half that constitutes the drive pulley, so that the first clutching means can engage and disengage the drive pulley to and from the input shaft. In this way, components around the input shaft are positioned effectively for compactness. Moreover, as the first clutching means (CVT clutch) is provided on the input shaft, which is located upstream in the rotational transmission path of the continuously variable ratio-change mechanism, by controlling the first clutching means appropriately, a prevention is made against slippage of the belt that can occur just after the start of the engine because of a delay in the supply of the pulley thrust pressures to the drive and driven pulleys.

Furthermore, the drive pulley is equipped with a drive oil chamber, which is used for controlling the pulley width of the drive pulley, and preferably, the drive oil chamber and at least part of the third clutching means, which is provided on the output shaft, are positioned substantially in a common plane that is perpendicular to the axes of the shafts. Here, because the middle shaft is provided between the input shaft and the output shaft, the distance between the axes of the input and output shafts can be determined relatively freely. Therefore, the drive oil chamber, which has a relatively large dimension and disposed on the input shaft, and the third clutching means, which is disposed on the output shaft, are positioned substantially in a common plane that is perpendicular to the axes of the shafts. This arrangement enables these members to be placed in the housing of the transmission effectively to economize the space of the housing, so this is advantageous for miniaturizing and compacting the transmission.

Moreover, a coupling rotational mechanism (for example, the torque converter TC described in the following embodiment), which transmits the rotational driving force of the drive source (engine) to the input shaft, is provided on the input shaft at the end thereof that faces the drive source, and a hydraulic oil delivery portion, where hydraulic oil is delivered from the housing side to an oil passage that extends axially in the input shaft, is provided between the coupling rotational mechanism and the first rotational transmission gear train on the input shaft. It is preferable that this hydraulic oil delivery portion and the second clutching means, which is provided on the middle shaft, be positioned substantially in a common plane that is perpendicular to the axes of the shafts. In this way, the second clutching means, whose diameter is relatively large, can be placed closer to the hydraulic oil delivery portion to exploit the space around the hydraulic oil delivery portion, whose diameter is relatively small. Therefore, this arrangement further expedites the miniaturization and compactness of the transmission.

According to a third aspect of the present invention, a power transmission comprises a continuously variable ratio-change mechanism (for example, the belt type continuously variable ratio-change mechanism CVT described in the following embodiment) and a fixed ratio rotational transmission mechanism, which are disposed parallel with each other between an input shaft (for example, the primary shaft 1 described in the following embodiment) and an output shaft (for example, the countershaft 3 described in the following embodiment). The continuously variable ratio-change mechanism comprises a drive pulley, which is provided on the input shaft, a driven pulley, which is provided on the middle shaft (for example, the secondary shaft 2 described in the following embodiment), and a V belt, which is disposed around the drive pulley and the driven pulley. The fixed ratio rotational transmission mechanism comprises a first rotational transmission gear train (for example, the LOW or forward drive gear train described in the following embodiment), which transmits the rotation of the input shaft to the middle shaft, and a second rotational transmission gear train (for example, the forward output transmission gear train described in the following embodiment), which transmits the rotation of the middle shaft to the output shaft. In this transmission, the first rotational transmission gear train is positioned toward the back of the drive oil chamber provided on a side of the drive pulley to control the pulley width thereof, the second rotational transmission gear train is positioned between the driven pulley and the first rotational transmission gear train on the middle shaft, and the second rotational transmission gear train and the drive oil chamber are positioned substantially in a common plane that is perpendicular to the axes of the shafts.

By this arrangement, the continuously variable ratio-change mechanism and the fixed ratio rotational transmission mechanism are placed compactly in parallel with each other, making the transmission relatively small and compact. Especially, because the second rotational transmission gear train is positioned between the driven pulley and the first rotational transmission gear train on the middle shaft, and because the second rotational transmission gear train and the drive oil chamber are positioned substantially in a common plane that is perpendicular to the axes of the shafts, the second rotational transmission gear train is positioned along the space surrounding the drive oil chamber, whose diameter is relatively large. In this way, the space around the drive oil chamber is used effectively to compact the transmission.

In the above described power transmission, the housing that accommodates the continuously variable ratio-change mechanism and the fixed ratio rotational transmission mechanism comprises a first accommodation room and a second accommodation room. Preferably, the first accommodation room accommodates the continuously variable ratio-change mechanism and the drive gear (for example, the forward drive gear 34 described in the following embodiment) of the second rotational transmission gear train while the second accommodation room accommodates the fixed ratio rotational transmission mechanism excluding the drive gear of the second rotational transmission gear train. In this case, the drive gear of the second rotational transmission gear train meshes with the driven gear (the forward driven gear 35 described in the following embodiment) of the second rotational transmission gear train through an opening provided in a partition wall (for example, the second partition wall 6 described in the following embodiment) that partitions the housing into the first accommodation room and the second accommodation room. In this way, these two gears (the drive and driven gears of the second rotational transmission gear train), which are placed separately in the first and second accommodation rooms, respectively, are set to mesh directly with each other through the opening. This arrangement provides no partition wall around the meshing portions of the gears, so the axial length of the transmission can be made shorter than otherwise, at least for the dimension of the partition wall, which is eliminated. As a result, the transmission is further miniaturized and compacted in size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Now, preferred embodiments according to the present invention are described in reference to the drawings.

First Embodiment

Figure 1:
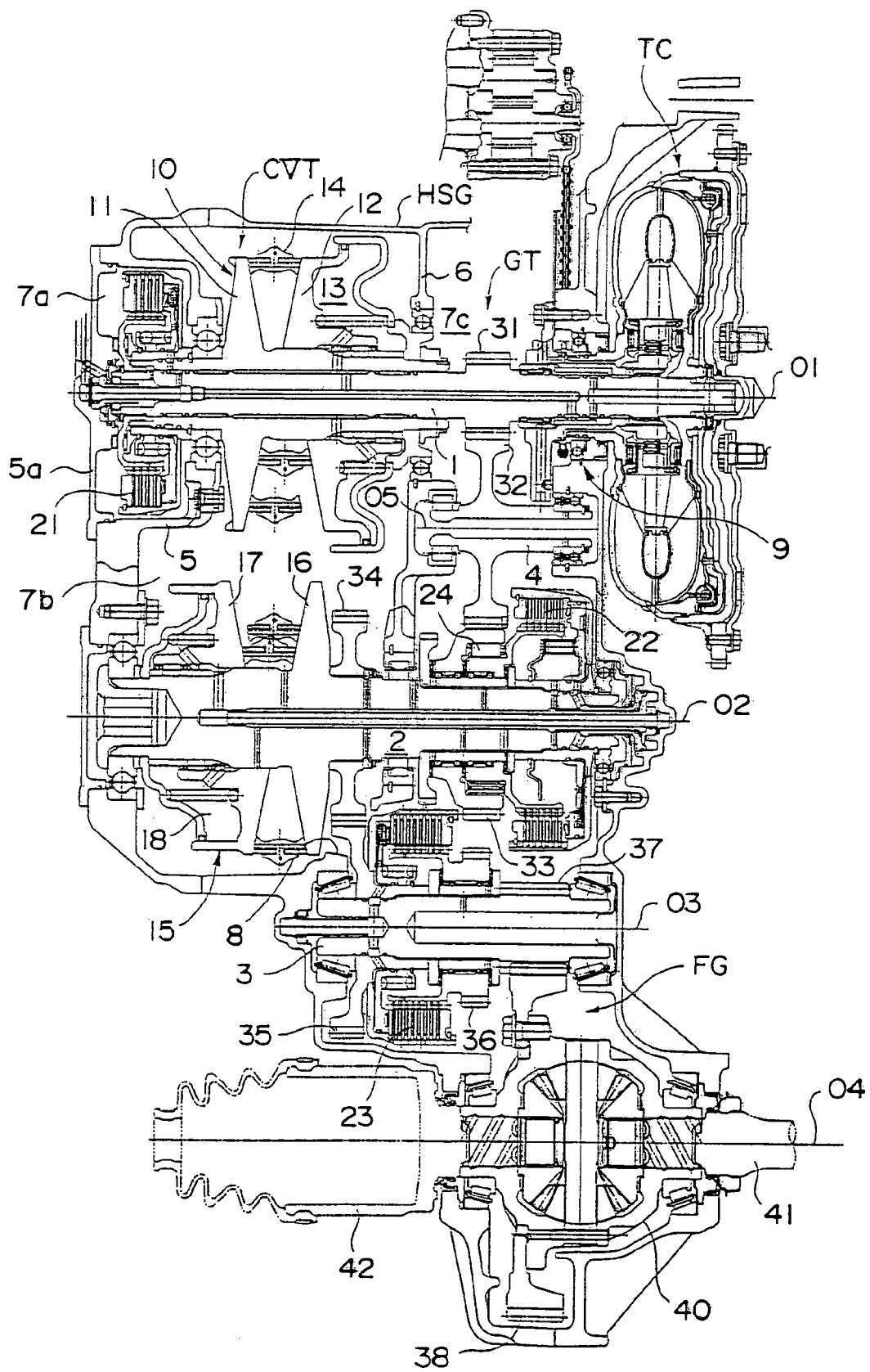
FIG. 1 is a cross-sectional view of a transmission as an embodiment according to the present invention, showing the internal arrangement of the transmission.
Figure 2:
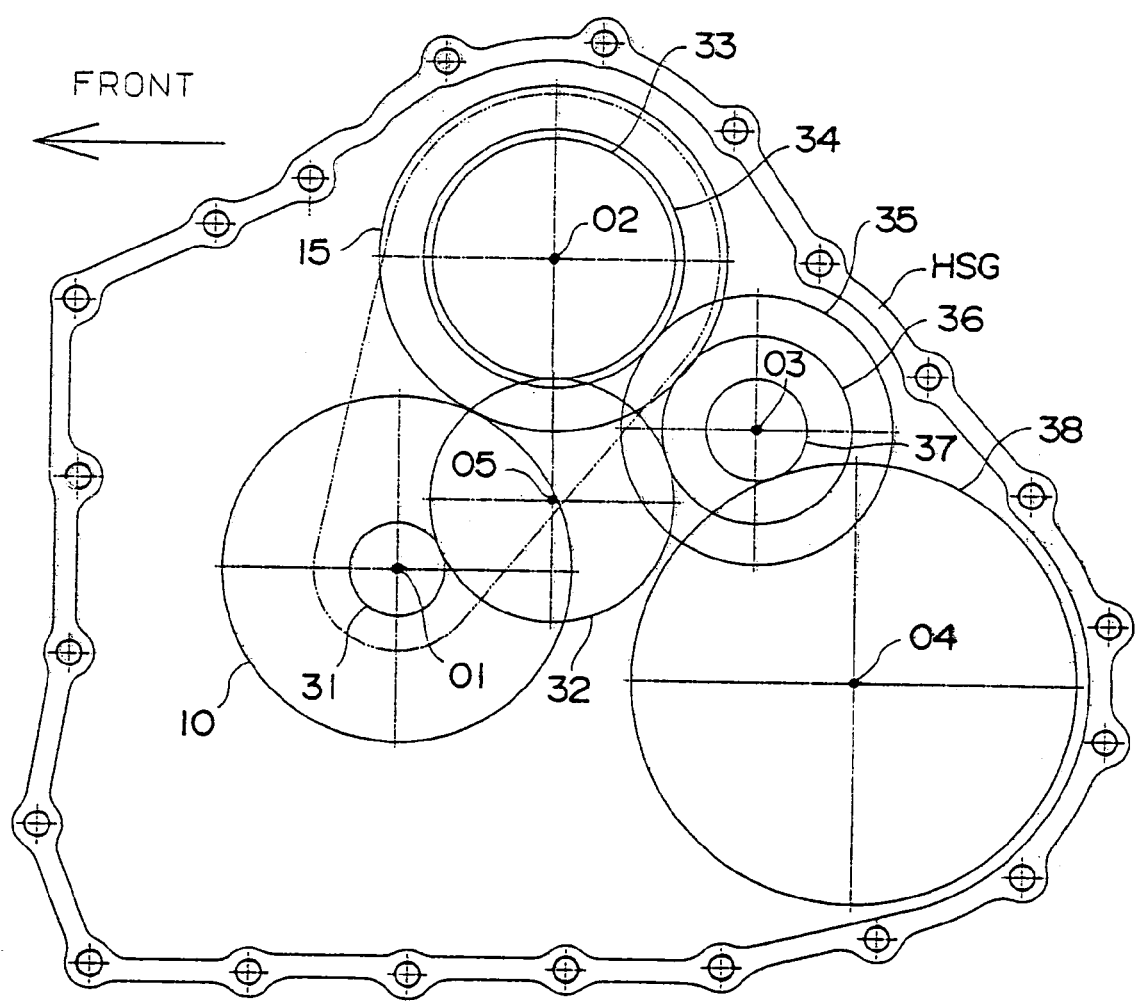
FIG. 2 is a generalized side view showing the positions of the shafts of this transmission.
Figure 3:
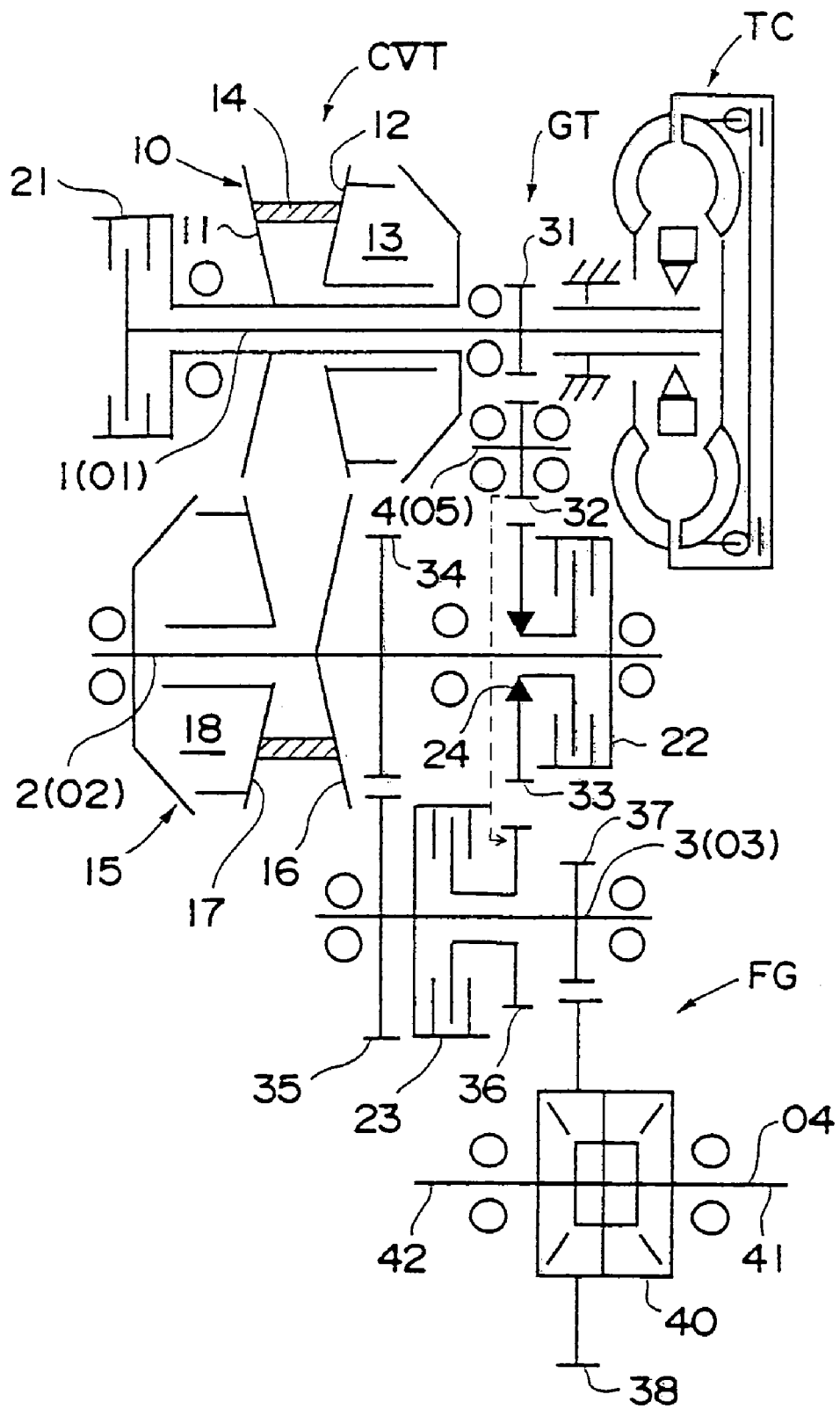
FIG. 3 is a skeleton diagram showing the power transmission paths of the transmission.

FIG. 1~FIG. 3 show a transmission (power transmission) as an embodiment according to the present invention. This transmission comprises a torque converter TC, a belt type continuously variable ratio-change mechanism CVT, a fixed ratio rotational transmission mechanism GT, and a final reduction mechanism FG in a transmission housing HSG as shown in the drawings. The input member (pump impeller) of the torque converter TC is coupled with the output shaft of an engine (not shown) while the output member (turbine runner) of the torque converter TC is coupled with a primary shaft (input shaft) 1. In this arrangement, the rotation output from the engine is transmitted through the torque converter TC to the primary shaft 1, whose rotational axis is marked with "O1".

In the housing HSG, a secondary shaft (middle shaft) 2 is disposed rotatably in parallel with and at a predetermined distance from the primary shaft 1, and the belt type continuously variable ratio-change mechanism CVT is disposed around the primary shaft 1 and the secondary shaft 2, whose rotational axis is indicated with "O2". The belt type continuously variable ratio-change mechanism CVT comprises a drive pulley 10, which is supported by the primary shaft 1, a driven pulley 15, which is supported by the secondary shaft 2, and a metal belt 14, which is disposed around these pulleys 10 and 15.

The drive pulley 10 comprises a stationary pulley half 11, which is disposed rotatably on the primary shaft 1, and a movable pulley half 12, which is rotatable as a unit with the stationary pulley half 11 and is movable closer to and away from the stationary pulley half 11 in the axial direction of the pulley. On the outward side of the movable pulley half 12, provided is a drive oil chamber 13, where a hydraulic pressure is supplied to control the axial movement of the movable pulley half 12 of the drive pulley. The driven pulley 15 comprises a stationary pulley half 16, which is fixed on the secondary shaft 2, and a movable pulley half 17, which is rotatable as a unit with the stationary pulley half 16 and is movable closer to and away from the stationary pulley half 16 in the axial direction of the pulley. On the outward side of the movable pulley half 17, provided is a driven oil chamber 18, where a hydraulic pressure is supplied to control the axial movement of the movable pulley half 17 of the driven pulley.

In the continuously variable ratio-change mechanism CVT, the pulley width of the drive pulley 10 and that of the driven pulley 15 are varied and adjusted by controlling the above mentioned hydraulic pressures being supplied to the drive oil chamber 13 and to the driven oil chamber 18, respectively, so that the radii of the contact circles of the metal V belt 14 on the drive and driven pulleys are varied to continuously change the speed change ratio for transmitting the rotation of the drive pulley 10 to the driven pulley 15. On the primary shaft 1, behind the stationary pulley half 11 of the drive pulley 10, provided is a CVT clutch 21, which engages and disengages the drive pulley 10, which is disposed rotatably on the primary shaft 1, to and from the primary shaft 1. By placing the CVT clutch 21 on the primary shaft 1 and upstream in the rotational transmission path of the continuously variable ratio-change mechanism CVT in this way, a prevention measure is provided against slippage of the belt. Because the CVT clutch 21 can be controlled appropriately, slip of the belt, which could otherwise occur from a delay in the supply of the pulley-width control pressures to the drive and driven oil chambers 13 and 18, respectively, just after the start of the engine, is prevented effectively.

The transmission housing HSG comprises a first partition wall 5, which defines a clutch accommodation room 7a. This room is a recessed space with an outward opening, and it accommodates the CVT clutch 21. With the CVT clutch 21 placed therein, a cover 5a is bolted and fixed to cover the clutch accommodation room 7a. If the cover 5a is removed, then the CVT clutch 21 is accessible and removable from the outside of the transmission. The transmission housing HSG further comprises a second partition wall 6, which partitions the accommodation room of the housing into two rooms, i.e., a first accommodation room 7b and a second accommodation room 7c. The above described continuously variable ratio-change mechanism CVT is placed in the first accommodation room 7b.

Now, the fixed ratio rotational transmission mechanism GT comprises a LOW gear train (forward drive gear train) that includes an input drive gear 31, an idler gear 32, and a LOW driven gear 33. In the gear train, the input drive gear 31 meshes with the idler gear 32, and the idler gear 32 in turn meshes with the LOW driven gear 33, which is disposed rotatably on the secondary shaft 2. The input drive gear 31 is formed as a one-piece body with the primary shaft 1 while the idler gear 32 is formed also as a one-piece body with an idler shaft 4, which extends parallel with the primary shaft 1 at a predetermined distance from each other and is supported rotatably by the housing HSG. In the drawings, the rotational axis of the idler shaft 4 is indicated with "O5".

A one-way clutch 24 is provided internal to the input driven gear 33, and a LOW clutch 22 is provided next to the input driven gear 33. In this arrangement, the LOW clutch 22 engages and disengages the input driven gear 33 to and from the secondary shaft 2 through the one-way clutch 24. While the LOW clutch 22 is in engagement, the rotation is transmitted from the input drive gear 31 through the LOW gear train to the secondary shaft 2 in forward drive direction. Here, the one-way clutch 24 functions not to transmit the rotation in the opposite direction (direction where a rotation acts as an engine brake). On the other hand, while the LOW clutch 22 is in disengagement, no rotational transmission occurs through the LOW gear train.

The fixed ratio rotational transmission mechanism GT further comprises a forward output transmission gear train that includes a forward drive gear 34 and a forward driven gear 35, which meshes with the forward drive gear 34. The forward drive gear 34 is fixed on the secondary shaft 2 while the forward driven gear 35 is fixed on a countershaft 3, which extends parallel with the secondary shaft 2 at a predetermined distance therefrom and is supported rotatably by the housing HSG. In this arrangement, the rotation of the secondary shaft 2 is transmitted through the forward output transmission gear train to the countershaft 3, whose rotational axis is indicated with "O3".

The fixed ratio rotational transmission mechanism GT further comprises a reverse driven gear 36, which is disposed rotatably on the countershaft 3 and meshes with the above mentioned idler gear 32. As a result, the above mentioned input drive gear 31 and idler gear 32 together with this reverse driven gear 36 constitute a reverse drive gear train. In addition, the reverse driven gear 36 is provided with a reverse clutch 23, which engages and disengages the reverse driven gear 36 to and from the countershaft 3. As a result, while the reverse clutch 23 is in engagement, the rotational power is transmitted through the reverse drive gear train.

A final drive gear 37 is formed as a one-piece body with the countershaft 3 to mesh with a final driven gear 38, and the final drive and driven gears 37 and 38 constitute the above mentioned final reduction mechanism FG. The final driven gear 38 is connected to a differential mechanism 40, through which the rotation of the final driven gear 38 is transmitted to right and left axle shafts 41 and 42, respectively, to drive right and left wheels (not shown). The rotational axis of the final driven gear 38 and the differential mechanism 40 is indicated with "O4".

Of the fixed ratio rotational transmission mechanism GT, only the forward drive gear 34 is placed in the first accommodation room 7b while the other components of the fixed ratio rotational transmission mechanism GT are all placed in the second accommodation room 7c, where the final reduction mechanism FG is also accommodated. In this arrangement, the forward drive gear 34 and the forward driven gear 35, which mesh with each other and constitute the forward output transmission gear train, are placed separately in the first accommodation room 7b and in the second accommodation room 7c, respectively.

Figure 4:
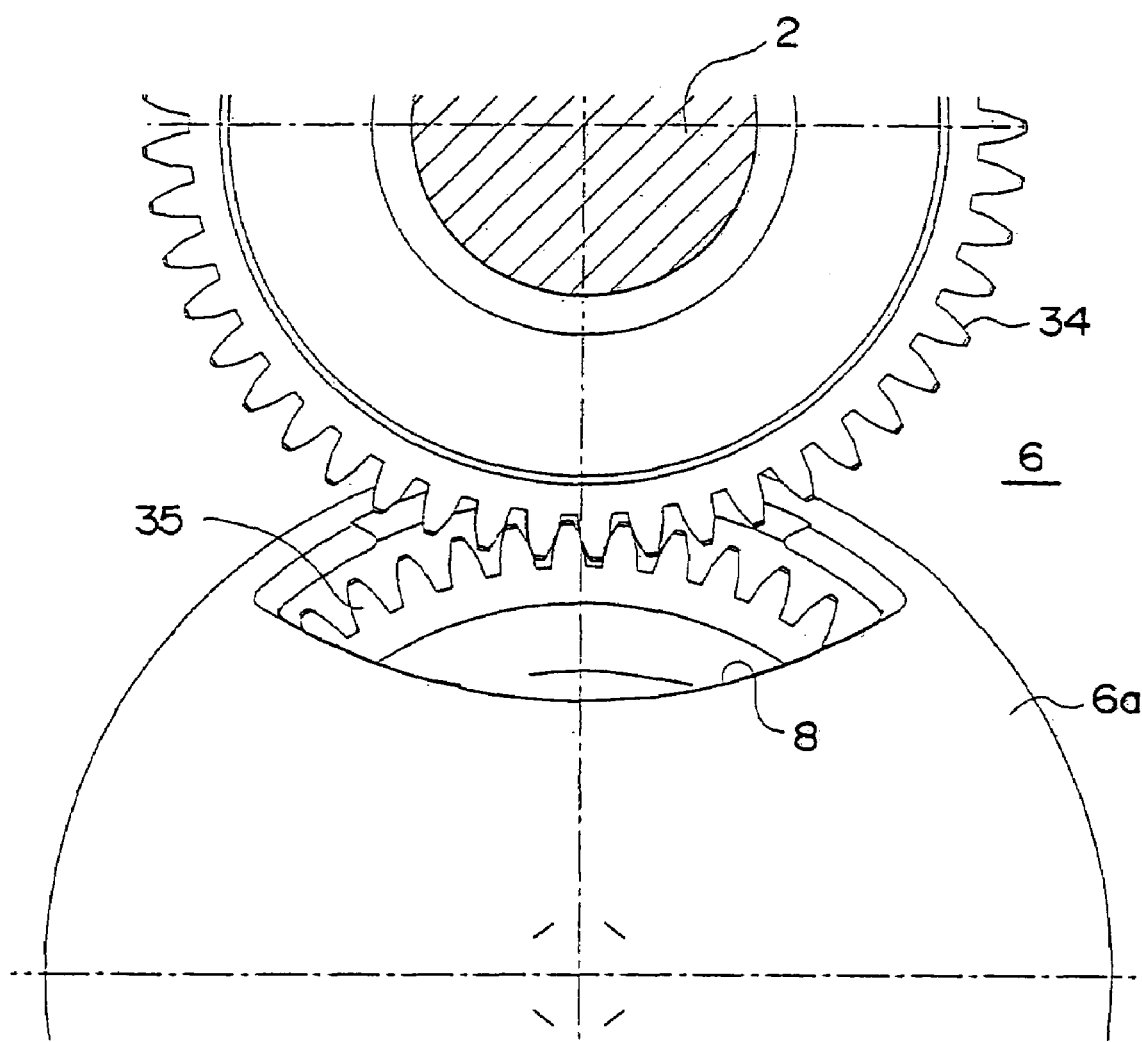
FIG. 4 is a partially sectional side view showing part of a second partition wall of the transmission, around an opening.
Figure 5:
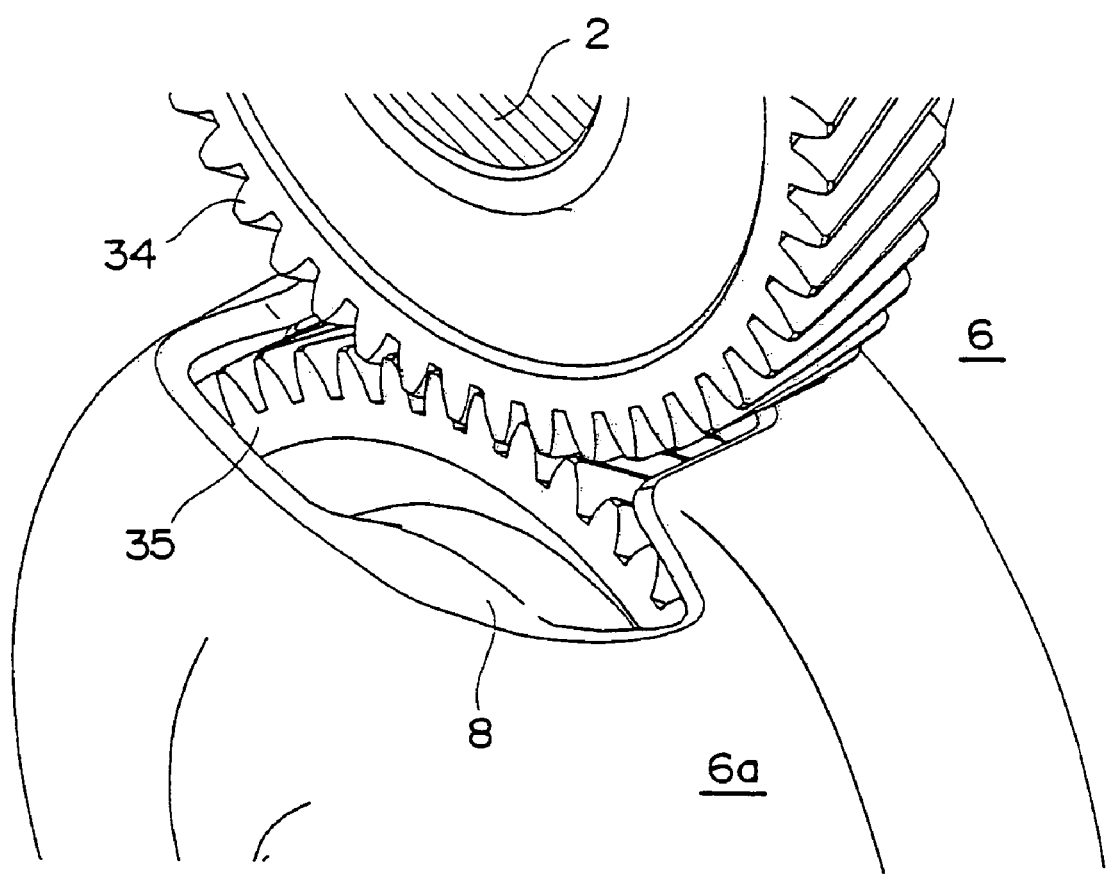
FIG. 5 is a partially sectional, perspective view showing part of the second partition wall around the opening.

For this separated accommodation, the second partition wall 6 has an opening 8, through which these gears 34 and 35 are set to mesh with each other as shown in FIGS. 4 and 5. FIGS. 4 and 5 are views of the forward drive and driven gears 34 and 35 and the second partition wall 6, taken from the first accommodation room 7b. In these drawings, the forward drive gear 34 is located in front of the second partition wall 6 (or located in the first accommodation room 7b) and extends passing through the second partition wall 6. The forward drive gear 34 is spline-connected to the secondary shaft 2, which is supported rotatably with a roller bearing 2a in the second partition wall 6.

The second partition wall 6 is formed bulging cylindrically into the first accommodation room 7b where the forward driven gear 35 is positioned. In this cylindrically bulged portion 6a, the forward driven gear 35 is spline-connected to the countershaft 3, whose nearest end is supported rotatably with a taper roller bearing 3a there. The cylindrically bulged portion 6a has an opening 8 as shown in the drawings, through which opening the forward drive gear 34 meshes with the forward driven gear 35. In this way, these two gears 34 and 35, which are placed separately in the first and second accommodation rooms 7b and 7c, respectively, are set to mesh directly with each other through the opening 8, where no partition wall exists around the meshing portions of the gears. Therefore, this arrangement can make the axial length of the transmission shorter than otherwise, at least for the dimension of the partition wall. In other words, because members that are placed separately in two accommodation rooms 7b and 7c are positioned closer to each other for their meshing without any obstruction from the wall that partitions the two rooms 7b and 7c, the axial length of the transmission can be shorter than otherwise. This arrangement is advantageous for miniaturizing and compacting the transmission.

Figure 6:
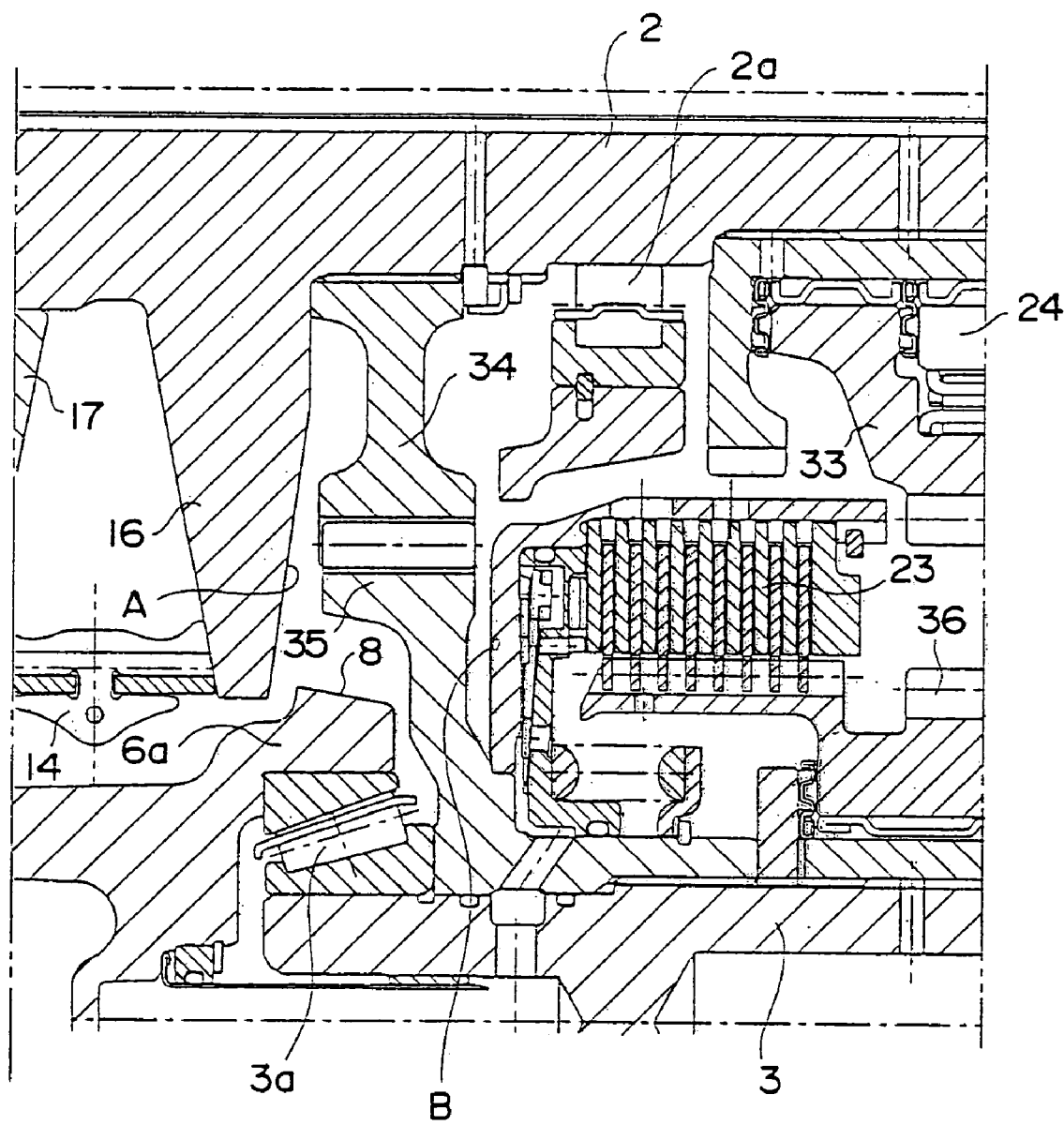
FIG. 6 is a cross-sectional view showing the arrangement of components that are positioned around the opening, which is provided in the second partition wall.
Figure 7:
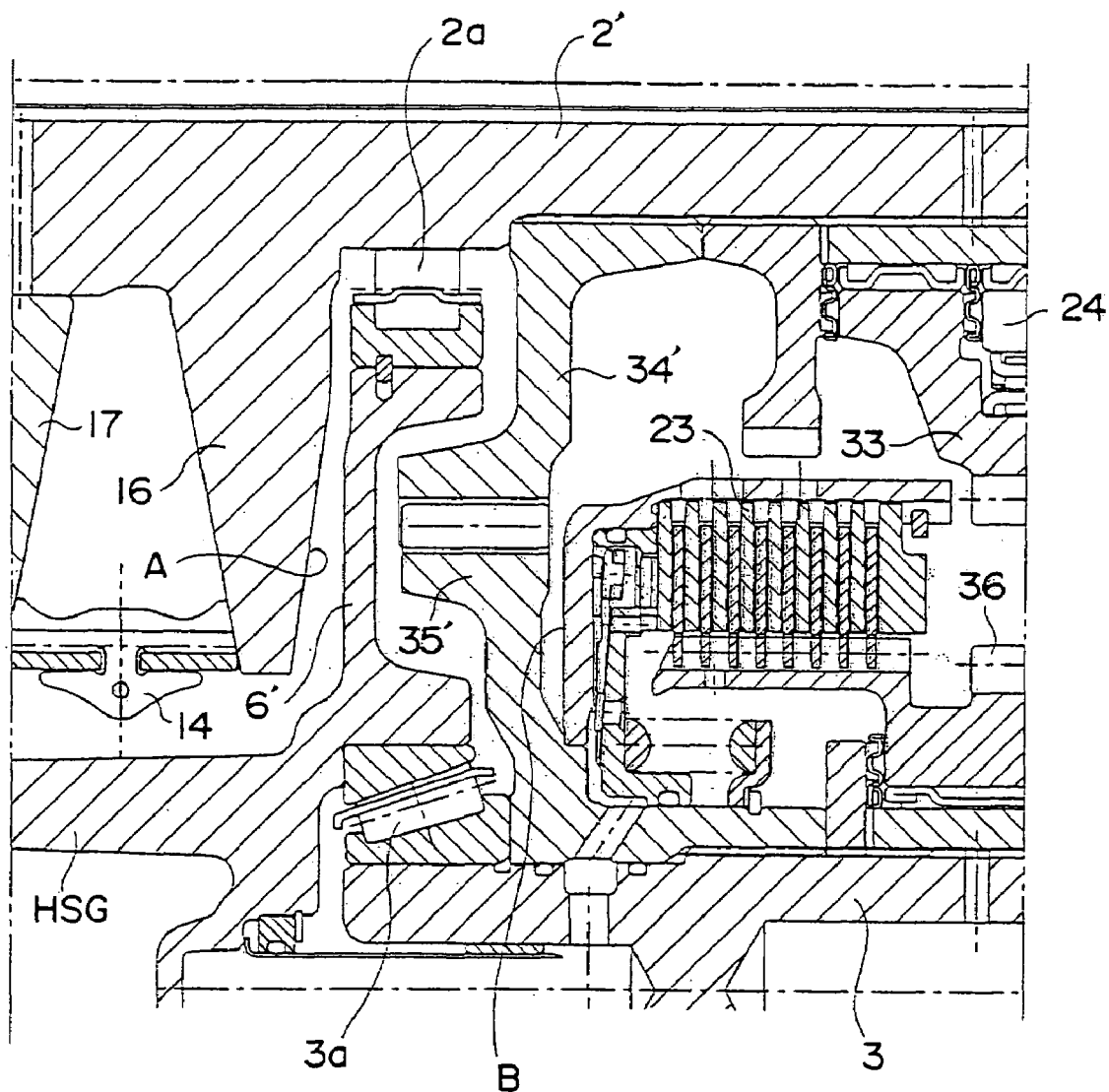
FIG. 7 is a cross-sectional view showing the arrangement of components that correspond to those shown in FIG. 6, FIG. 7 being a case where no opening is provided in the second partition wall.

This arrangement is further described in reference to FIGS. 6 and 7. FIG. 6 shows, in enlargement, components of the transmission that are positioned around the opening 8. Through this opening 8, the forward drive gear 34 and the forward driven gear 35, which are placed separately in the first and second accommodation rooms 7b and 7c, mesh with each other. On the other hand, FIG. 7 shows an arrangement of corresponding components for a case where no opening 8 is provided, i.e., a prior-art arrangement. In these drawings, the identical components are indicated with identical numbers while the corresponding components with some difference in form are indicated with identical numbers appended with a prime mark.

As shown in FIG. 7, because the prior-art arrangement has a second partition wall 6', the forward drive gear 34' is placed in the second accommodation room 7c, where the forward drive gear 34' meshes with the forward driven gear 35' next to the second partition wall 6'. As a result, the dimension between the back face A of the stationary pulley half 16 of the driven pulley 15 and the back face B of the reverse clutch 23 is shorter for the arrangement of the embodiment according to the present invention shown in FIG. 6 than for the prior-art arrangement shown in FIG. 7.

Furthermore, in the arrangement of the embodiment according to the present invention, the forward output transmission gear train (which comprises the forward drive gear 34 and the forward driven gear 35) is positioned in the same radially extending plane where the member that constitutes the drive oil chamber 13 of the drive pulley 10 is positioned, to exploit the space surrounding the drive oil chamber 13, which has a relatively large diameter. In this way, the transmission is made compact.

On one hand, the part between the input drive gear 31 on the primary shaft 1 and the torque converter TC is surrounded by a hydraulic oil delivery portion 9, which is formed as a one-piece body with the housing HSG. At this hydraulic oil delivery portion 9, hydraulic oil is delivered to an oil passage that extends axially through the primary shaft 1 for charging and discharging the torque converter TC with oil and for supplying a hydraulic pressure to the drive oil chamber 13. Here, the hydraulic oil delivery portion 9 is positioned to share a common radially extending plane with the LOW clutch 22, so that the LOW clutch 22, whose diameter is relatively large, is placed closer to the hydraulic oil delivery portion 9 to exploit the space surrounding the hydraulic oil delivery portion 9, whose diameter is relatively small. In this way, the miniaturization and compactness of the transmission is further expedited.

Furthermore, an end of the reverse clutch 23 is positioned substantially in the same radially extending plane as the member that constitutes the drive oil chamber 13 of the drive pulley 10 is positioned on the primary shaft 1. This member is, in turn, positioned in the same radially extending plane as the forward output transmission gear train (including the forward drive gear 34 and the forward driven gear 35) is positioned as mentioned above. Because the secondary shaft 2 is provided between the primary shaft 1 and the countershaft 3, the distance between the axes of these two shafts 1 and 3 is determined relatively freely. Therefore, the drive oil chamber 13, which has a relatively large dimension and disposed on the primary shaft 1, and the reverse clutch 23, which is disposed on the countershaft 3, are placed substantially in the same radially expanding plane to use the space in the housing HSG effectively for miniaturizing and compacting the transmission. As mentioned above, the forward output transmission gear train 34 and 35, which is used for the rotational transmission between the secondary shaft 2 and the countershaft 3, is positioned substantially in the same radially expanding plane as the drive oil chamber 13 to exploit the space surrounding the drive oil chamber 13, which has a relatively large diameter. In this way, the transmission is made compact.

As described above, in the transmission according to this embodiment, the CVT clutch 21 is disposed on the primary shaft 1, the LOW clutch 22 is disposed on the secondary shaft 2, and the reverse clutch 23 is disposed on the countershaft 3. Because the clutches are dispersed onto the three shafts in this way, the transmission is balanced well. As a result, the axial dimension of the transmission is kept relatively short to achieve a small size for the transmission. In addition, the LOW clutch 22 and the reverse clutch 23 are disposed on the secondary shaft 2 and the countershaft 3, respectively, which shafts are located downstream in the respective rotational transmission paths of the fixed ratio rotational transmission mechanism GT. As a result, while the rotation is transmitted through the continuously variable ratio-change mechanism CVT with the clutches 22 and 23 being disengaged, relative rotational differences among the friction plates in these clutches are small, generating only a very small drag torque. This condition is advantageous in fuel economy and improves the durability of the clutches.

Now, the shift operation of the transmission, which is constructed as described above, is described. While the rotational driving force of the engine is being transmitted through the torque converter TC to the primary shaft 1, if the CVT clutch 21, the LOW clutch 22 and the reverse clutch 23 are in disengagement, this rotational driving force is not transmitted to the countershaft 3. The condition of the transmission is in neutral.

From the neutral condition, if the LOW clutch 22 is engaged to set the transmission into its LOW range, then the rotational driving force of the primary shaft 1 is transmitted through the LOW gear train (comprising the input drive gear 31, the idler gear 32 and the input driven gear 33) to the secondary shaft 2 and then through the forward output transmission gear train (comprising the forward drive gear 34 and the forward driven gear 35) to the countershaft 3. This rotational driving force is then transmitted through the final reduction mechanism FG to the right and left wheels to drive the vehicle. In the LOW range, the one-way clutch 24 functions to transmit the rotational driving force only in the direction for forward drive by precluding the transmission of the rotational driving force in the opposite direction.

Thereafter, if the CVT clutch 21 is engaged to set the transmission into its CVT range (forward continuously variable speed ratio range), the rotational driving force of the primary shaft 1 is transmitted to the drive pulley 10. In this mode of the transmission, the hydraulic pressures being supplied to the drive oil chamber 13 and the driven oil chamber 18 are controlled to vary the widths of the drive and driven pulleys for continuously variable speed ratio control. By this speed ratio control, the rotation of the driven pulley 15 on the secondary shaft 2 is varied continuously with respect to the drive pulley 10. This rotation of the secondary shaft 2 is transmitted through the forward output transmission gear train to the countershaft 3 and then through the final reduction mechanism FG to the right and left wheels to drive the vehicle.

On the other hand, from the neutral condition, if the reverse clutch 23 is engaged to set the transmission into its REVERSE range, then the rotational driving force of the primary shaft 1 is transmitted through the reverse drive gear train (comprising the input drive gear 31, the idler gear 32 and the reverse driven gear 36) to the countershaft 3. In this mode, the rotational direction of the countershaft 3 is opposite to that set in the above mentioned LOW range and CVT range. This rotational driving force is then transmitted through the final reduction mechanism FG to the right and left wheels to drive the vehicle rearward.

Second Embodiment

Figure 8:
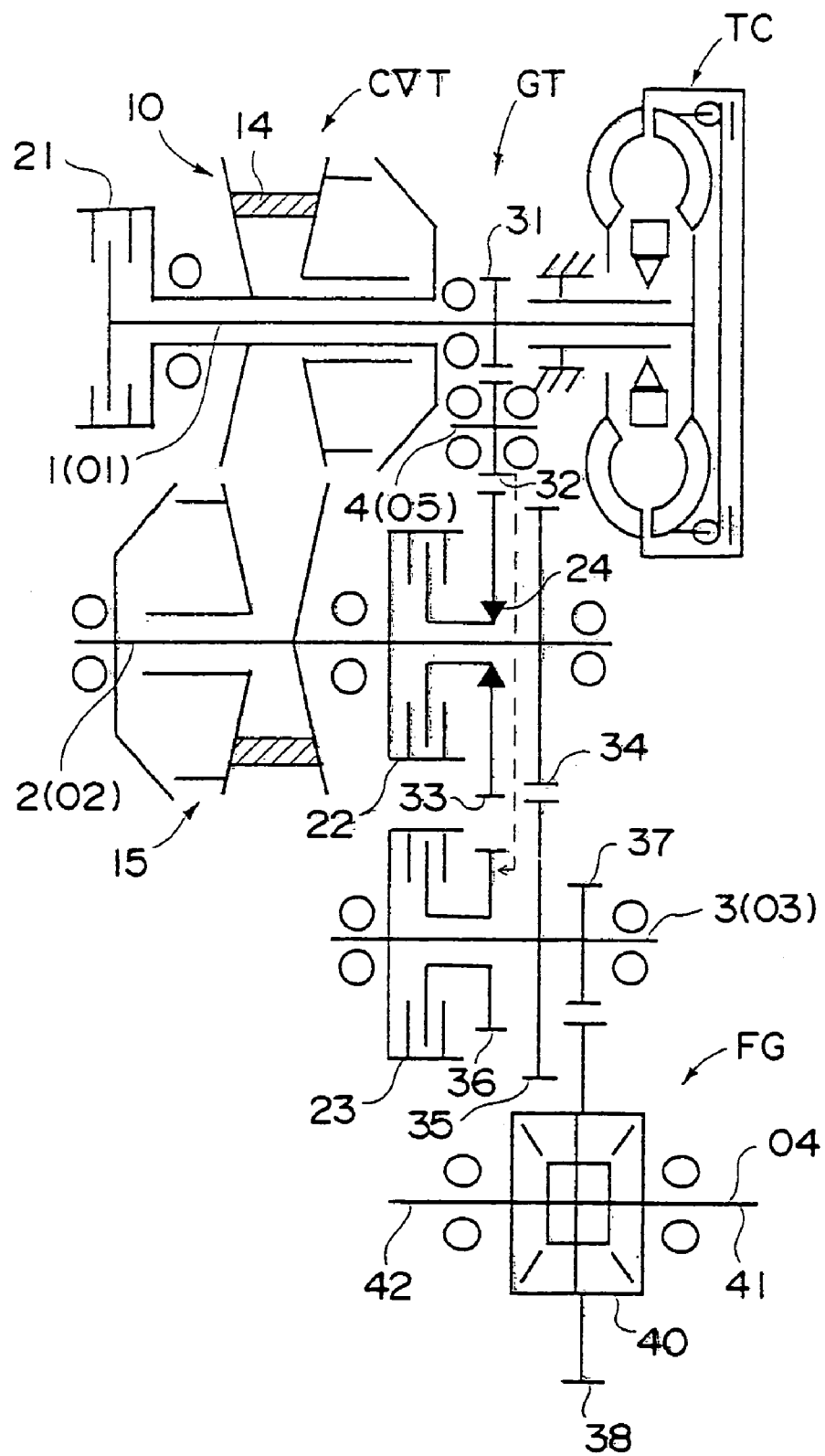
FIG. 8 is a skeleton diagram showing the power transmission paths of a transmission as a second embodiment according to the present invention.

Now, a power transmission as a second embodiment according to the present invention is described in reference to FIG. 8. The transmission shown in FIG. 8 has a construction similar to that of the first embodiment, which is described above. Therefore, the following description avoids needless repetition by giving identical numbers to components that have identical functions.

In this transmission, the positions of the LOW clutch 22 (and the LOW driven gear 33) and the forward drive gear 34 on the secondary shaft 2 are different from those of the transmission presented as the first embodiment. In addition, the position of the forward driven gear 35 on the countershaft 3 is different correspondingly to these positional differences. However, the other components have the positions identical with those of the first embodiment. With only the positional differences of the clutch and the gears, this transmission functions and operates identically as the transmission of the first embodiment.

Third Embodiment

Figure 9:
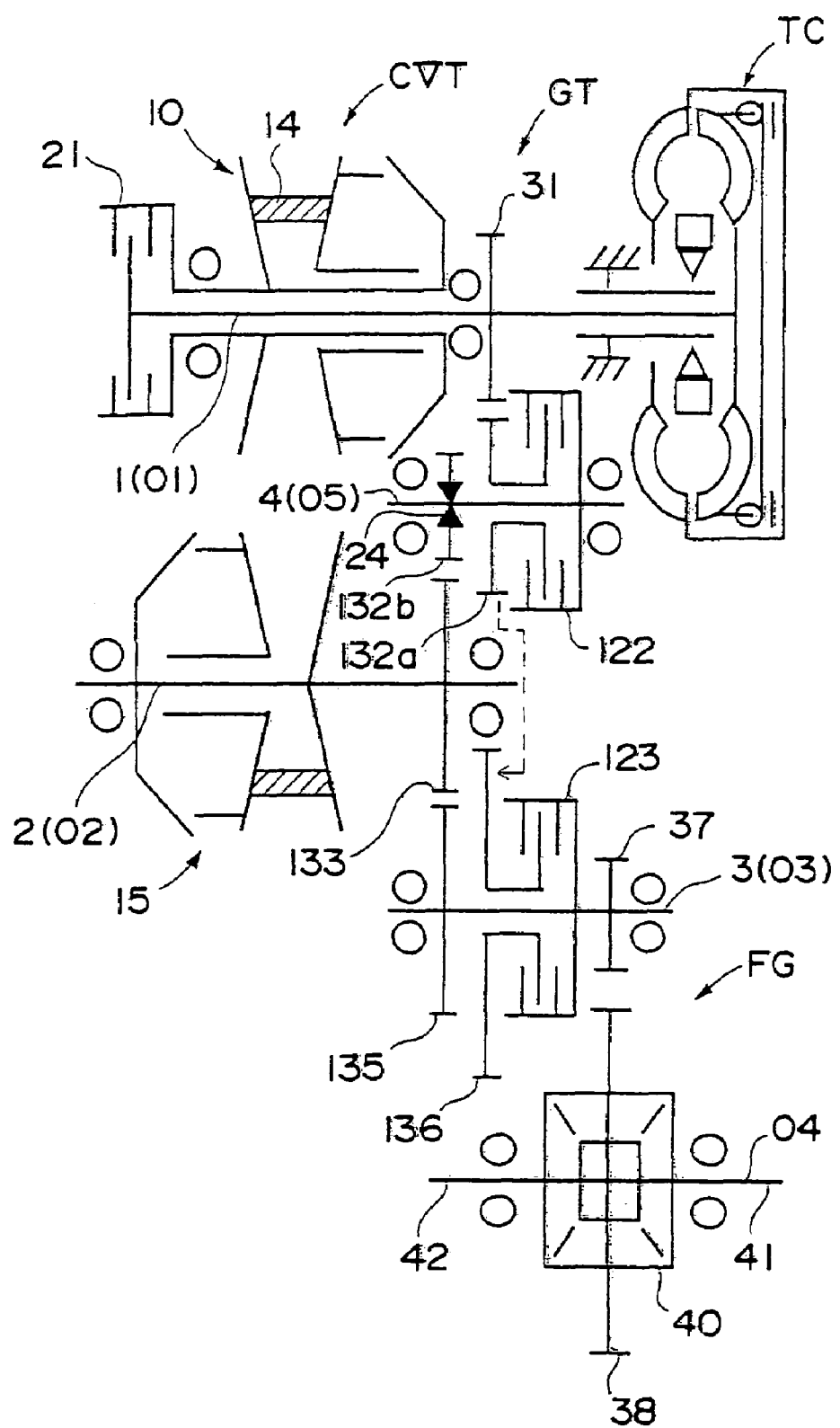
FIG. 9 is a skeleton diagram showing the power transmission paths of a transmission as a third embodiment according to the present invention.

Now, a transmission as a third embodiment according to the present invention is described in reference to FIG. 9. The transmission shown in FIG. 9 has a construction similar to that of the first embodiment, which is described above. Therefore, the description avoids needless repetition by giving identical numbers to components that have identical functions.

Also in this transmission, the torque converter TC, the belt type continuously variable ratio-change mechanism CVT, the fixed ratio rotational transmission mechanism GT, and the final reduction mechanism FG are disposed in the transmission housing HSG as shown in the drawing, in an arrangement similar to that of the transmission as the first embodiment. At first, the torque converter TC and the belt type continuously variable ratio-change mechanism CVT are identical with those of the first embodiment, so they are given identical numbers with no description. The CVT clutch 21 is also identical, so no further description is given here.

In this transmission, the fixed ratio rotational transmission mechanism GT has a construction different from that of the first embodiment. On the idler shaft 4 (rotational axis O5), a first idler gear 132a is disposed rotatably while a second idler gear 132b is disposed through the one-way clutch 24. As a result, the LOW gear train is different, and it comprises the input drive gear 31, the first idler gear 132a, which meshes with the input drive gear 31, the second idler gear 132b, and a LOW driven gear 133, which is fixed on the secondary shaft 2 and meshes with the second idler gear 132b. In addition, a LOW clutch 122 is provided on the idler shaft 4 to engage and disengage the first idler gear 132a to and from the idler shaft 4. With this arrangement, if the LOW clutch 122 is engaged, then the rotation in the forward drive direction can be transmitted from the input drive gear 31 through the LOW gear train to the secondary shaft 2. If the LOW clutch 122 is disengaged, no rotation is transmitted through the LOW gear train.

The forward output transmission gear train comprises the LOW driven gear 133, which constitutes the above described LOW gear train, and a forward driven gear 135, which is fixed on the countershaft 3 and meshes with the LOW driven gear 133. In other words, the LOW driven gear 133 also functions as a forward drive gear.

Furthermore, a reverse driven gear 136, which constitutes the reverse drive gear train, is disposed rotatably on the countershaft 3 to mesh with the above mentioned first idler gear 132a. In other words, in this embodiment, the input drive gear 31, the first idler gear 132a and the reverse driven gear 136 constitute the reverse drive gear train. Moreover, the reverse driven gear 136 is equipped with a reverse clutch 123, which is used to engage and disengage the reverse driven gear 136 to and from the countershaft 3. With this arrangement, if the reverse clutch 123 is engaged, then the transmission is set for transmitting the rotational power through the reverse drive gear train.

The construction of the final reduction mechanism FG is identical with that of the first embodiment, so no description is given here. Also, because the operation for a speed ratio change that corresponds to the engagement and disengagement of each clutch is identical with that of the first embodiment, the description of the operation is not repeated here.

Fourth Embodiment

Figure 10:
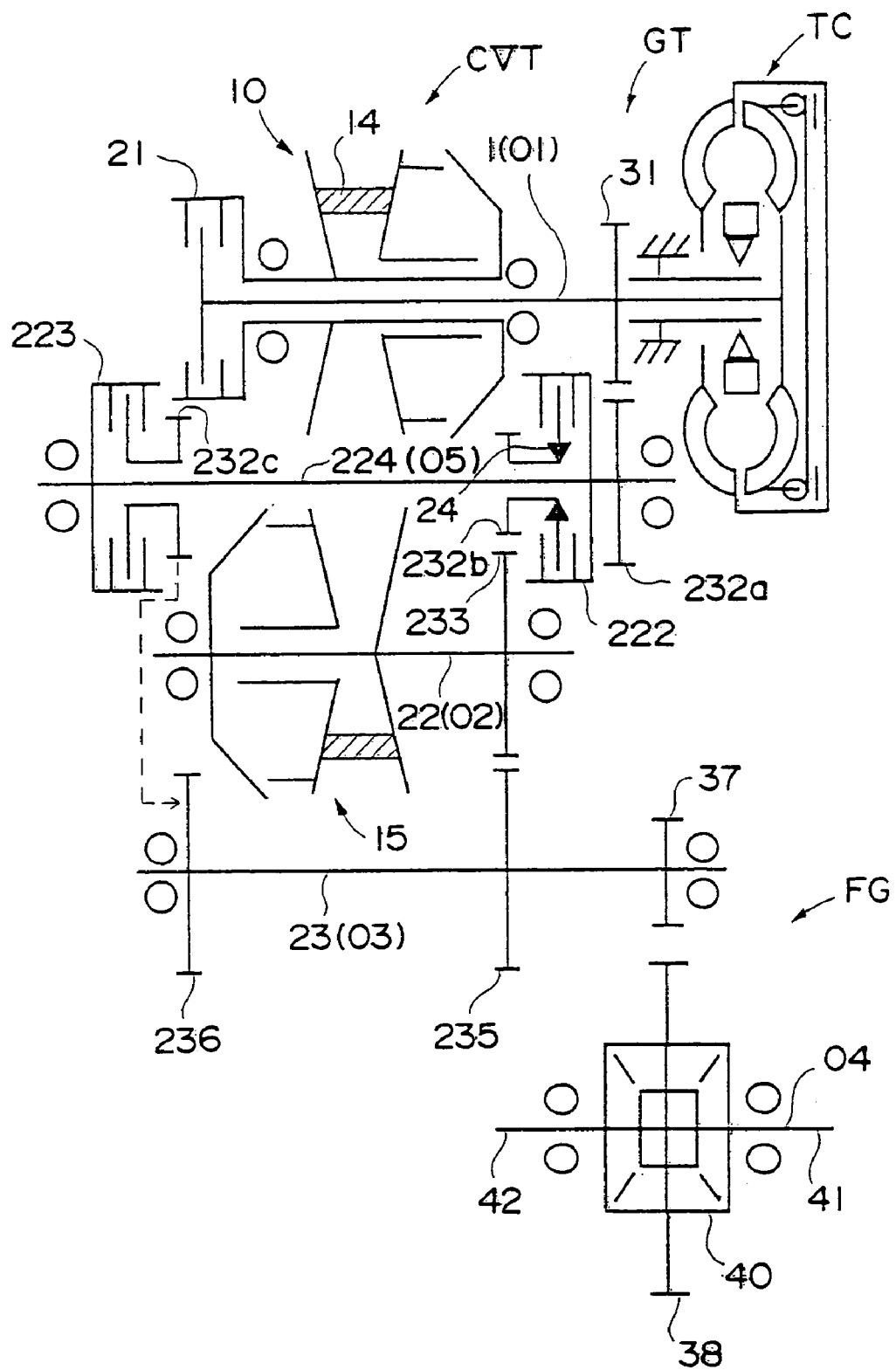
FIG. 10 is a skeleton diagram showing the power transmission paths of a transmission as a fourth embodiment according to the present invention.
Figure 11:
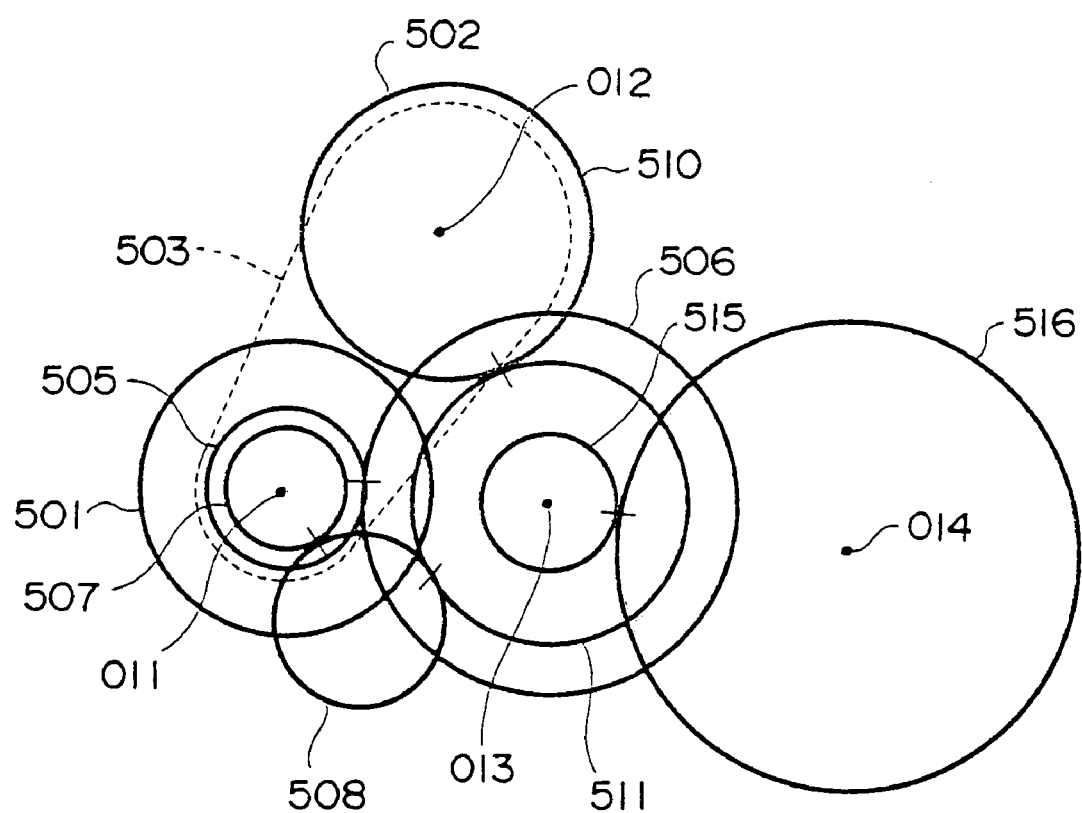
FIG. 11 is a skeleton diagram showing the power transmission paths of a prior-art transmission.

Now, a transmission as a fourth embodiment according to the present invention is described in reference to FIG. 10. The transmission shown in FIG. 10 has a construction similar to that of the first embodiment, which is described above. Therefore, the description avoids needless repetition by giving identical numbers to components that have identical functions.

Also in this transmission, the torque converter TC, the belt type continuously variable ratio-change mechanism CVT, the fixed ratio rotational transmission mechanism GT, and the final reduction mechanism FG are disposed in the transmission housing HSG as shown in the drawing, which arrangement is similar to that of the transmission as the first embodiment. At first, the torque converter TC and the belt type continuously variable ratio-change mechanism CVT are identical with those of the first embodiment, so they are given identical numbers with no description. The CVT clutch 21 is also identical, so no description is given here.

In this transmission, the fixed ratio rotational transmission mechanism GT has a construction different from that of the first embodiment. On an idler shaft 224 (rotational axis O5), a first idler gear 232a is fixed while a second idler gear 232b and a third idler gear 232c are disposed rotatably. As a result, the LOW gear train and the reverse drive gear train have a different construction, respectively. The LOW gear train comprises the input drive gear 31, the first idler gear 232a, which meshes with the input drive gear 31, the second idler gear 232b, and a LOW driven gear 233, which is fixed on a secondary shaft 22 and meshes with the second idler gear 232b. In addition, a LOW clutch 222 is provided through the one-way clutch 24 on the idler shaft 224 to engage and disengage the second idler gear 232*b* to and from the idler shaft 224. With this arrangement, if the LOW clutch 222 is engaged, then the rotation in the forward drive direction is transmitted from the input drive gear 31 through the LOW gear train to the secondary shaft 22. If the LOW clutch 222 is disengaged, no rotation is transmitted through the LOW gear train.

The forward output transmission gear train comprises the LOW driven gear 233, which constitutes the above described LOW gear train, and a forward driven gear 235, which is fixed on the countershaft 23 and meshes with the LOW driven gear 233. In other words, the LOW driven gear 233 also functions as a forward drive gear.

Furthermore, a reverse driven gear 236, which constitutes the reverse drive gear train, is disposed rotatably on the countershaft 23 to mesh with the above mentioned third idler gear 232*c*. In other words, in this embodiment, the input drive gear 31, the first idler gear 232*a*, the third idler gear 232*c* and the reverse driven gear 236 constitute the reverse drive gear train. Moreover, the third idler gear 232*c* is equipped with a reverse clutch 223, which is used to engage and disengage the third idler gear 232*c* to and from the idler shaft 224. With this arrangement, if the reverse clutch 223 is engaged, then the transmission is set for transmitting the rotational power through the reverse drive gear train.

The construction of the final reduction mechanism FG is identical with that of the first embodiment, so no description is given here. Also, because the operation for a speed ratio change that corresponds to the engagement and disengagement of each clutch is identical with that of the first embodiment, the description of the operation is not repeated here.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2003-035952 filed on Feb. 14, 2003, No. 2003-043769 filed on Feb. 21, 2003, and No.2003-045590 filed on Feb. 24, 2003, which are incorporated herein by reference.

What is claimed is:

1. A power transmission equipped with a continuously variable ratio-change mechanism and a fixed ratio rotational transmission mechanism, which transmit a rotational driving force of an input shaft rotationally driven by a drive source to an output shaft with a speed ratio change;

wherein:

said continuously variable ratio-change mechanism transmits a rotation from said input shaft to a middle shaft at a continuously variable speed change ratio; and said fixed ratio rotational transmission mechanism comprises a first rotational transmission gear train, a second rotational transmission gear train and a third rotational transmission gear train, said first rotational transmission gear train transmitting the rotation of said input shaft to said middle shaft, said second rotational transmission gear train transmitting the rotation of said middle shaft to said output shaft, and said third rotational transmission gear train transmitting the rotation of said input shaft to said output shaft without said middle shaft, and wherein said continuously variable ratio-change mechanism and said fixed ratio rotational transmission mechanism are disposed in parallel with one another and are selectively used for transmitting rotational force from the input shaft to the output shaft.

2. The power transmission as set forth in claim 1, wherein:

said first rotational transmission gear train comprises an input drive gear, which is provided on said input shaft, an idler gear, which is provided on an idler shaft and meshes with said input drive gear, and a forward driven gear, which is provided on said middle shaft and meshes with said idler gear; and said third rotational transmission gear train comprises said input drive gear, said idler gear and a reverse driven gear, which is provided on said output shaft and meshes with said idler gear.

3. The power transmission as set forth in claim 1, wherein:

first clutching means, which makes the rotation of said input shaft be transmitted through said continuously variable ratio-change mechanism to said middle shaft and then through said second rotational transmission gear train to said output shaft, is provided on said input shaft;

second clutching means, which makes the rotation of said input shaft be transmitted through said first and second rotational transmission gear trains to said output shaft, is provided on said middle shaft; and third clutching means, which makes the rotation of said input shaft be transmitted through said third rotational transmission gear train to said output shaft, is provided on said output shaft.

4. The power transmission as set forth in claim 3, wherein:

said continuously variable ratio-change mechanism comprises a drive pulley, which is provided on said input shaft, a driven pulley, which is provided on said middle shaft, and a V belt, which is disposed around said drive pulley and said driven pulley; and said first clutching means is provided on said input shaft and positioned on a back of a stationary pulley half that constitutes said drive pulley, so that said first clutching means can engage and disengage said drive pulley to and from said input shaft.

5. The power transmission as set forth in claim 3, wherein:

said continuously variable ratio-change mechanism comprises a drive pulley, which is provided on said input shaft, a driven pulley, which is provided on said middle shaft, and a V belt, which is disposed around said drive pulley and said driven pulley;

said drive pulley is equipped with a drive oil chamber that controls a pulley width of said drive pulley; and said drive oil chamber and at least part of said third clutching means, which is provided on said output shaft, are positioned substantially in a common plane that is perpendicular to axes of said shafts.

6. The power transmission as set forth in claim 3, wherein:

a coupling rotational mechanism for transmitting the rotational driving force of said drive source to said input shaft is provided on said input shaft at an end thereof facing said drive source;

a hydraulic oil delivery portion is provided between said coupling rotational mechanism and said first rotational transmission gear train on said input shaft, said hydraulic oil delivery portion being where hydraulic oil is delivered from a housing side to an oil passage that is provided extending axially in said input shaft; and said hydraulic oil delivery portion and said second clutching means, which is provided on said middle shaft, are positioned substantially in a common plane that is perpendicular to the axes of said shafts.

7. The power transmission as set forth in claim 1, wherein:
said first rotational transmission gear train comprises an input drive gear, which is provided on said input shaft, a first idler gear, which is provided on an idler shaft and meshes with said input drive gear, a second idler gear, which is provided on said idler shaft, and an input driven gear, which is provided on said middle shaft and meshes with said second idler gear;
said second rotational transmission gear train comprises said input driven gear and a forward driven gear, which is fixed on said output shaft and meshes with said input driven gear; and
said third rotational transmission gear train comprises said input drive gear, said first idler gear and a reverse driven gear, which is provided on said output shaft and meshes with said first idler gear.

8. The power transmission as set forth in claim 7, wherein:
said first idler gear is provided rotatably on said idler shaft;
second clutching means, which engages and disengages said first idler gear to and from said idler shaft, is provided on said idler shaft;
said reverse driven gear is provided rotatably on said output shaft; and
third clutching means, which engages and disengages said reverse driven gear to and from said output shaft, is provided on said output shaft.

9. The power transmission as set forth in claim 1, wherein:
said first rotational transmission gear train comprises an input drive gear, which is provided on said input shaft, a first idler gear, which is provided on an idler shaft and meshes with said input drive gear, a second idler gear, which is provided on said idler shaft, and an input driven gear, which is provided on said middle shaft and meshes with said second idler gear;
said second rotational transmission gear train comprises said input driven gear and a forward driven gear, which is provided on said output shaft and meshes with said input driven gear; and
said third rotational transmission gear train comprises said input drive gear, said first idler gear, a third idler gear, which is provided on said idler shaft, and a reverse driven gear, which is provided on said output shaft and meshes with said third idler gear.

10. The power transmission as set forth in claim 9, wherein:
second clutching means, which engages and disengages said second idler gear to and from said idler shaft, is provided through a one-way clutch on said idler shaft; and
third clutching means, which engages and disengages said third idler gear to and from said idler shaft, is provided on said idler shaft.

11. A power transmission equipped with a continuously variable ratio-change mechanism and a fixed ratio rotational transmission mechanism, which transmit a rotational driving force of an input shaft rotationally driven by a drive source to an output shaft with a speed ratio change;
wherein:
said continuously variable ratio-change mechanism transmits a rotation from said input shaft to a middle shaft at a continuously variable speed change ratio; and
said fixed ratio rotational transmission mechanism comprises a first rotational transmission gear train, a second rotational transmission gear train and a third rotational transmission gear train, said first rotational transmission gear train transmitting the rotation of said input shaft to said middle shaft, said second rotational transmission gear train transmitting the rotation of said middle shaft to said output shaft, and said third rotational transmission gear train transmitting the rotation of said input shaft to said output shaft,
said continuously variable ratio-change mechanism comprises a drive pulley, which is provided on said input shaft, a driven pulley, which is provided on said middle shaft, and a V belt, which is disposed around said drive pulley and said driven pulley;
said first rotational transmission gear train is positioned toward a back of a drive oil chamber, which is provided on a side of said drive pulley to control the pulley width thereof;
said second rotational transmission gear train is positioned between said driven pulley and said first rotational transmission gear train on said middle shaft; and
said second rotational transmission gear train and said drive oil chamber are positioned substantially in a common plane that is perpendicular to the axes of said shafts.

12. The power transmission as set forth in claim 11, wherein:
a housing that accommodates said continuously variable ratio-change mechanism and said fixed ratio rotational transmission mechanism comprises a first accommodation room, which accommodates said continuously variable ratio-change mechanism and a drive gear of said second rotational transmission gear train, and a second accommodation room, which accommodates said fixed ratio rotational transmission mechanism except the drive gear of said second rotational transmission gear train; and
the drive gear of said second rotational transmission gear train meshes with a driven gear of said second rotational transmission gear train through an opening provided in a partition wall that partitions said housing into said first accommodation room and said second accommodation room.

* * * * *